(12) United States Patent
MacNeish, III et al.

(10) Patent No.: US 12,318,997 B2
(45) Date of Patent: Jun. 3, 2025

(54) NOZZLE ASSEMBLY WITH A SERPENTINE PATH FOR PRINTER HEAD OF 3D PRINTER

(71) Applicant: Nexa3D Inc., Ventura, CA (US)

(72) Inventors: William Jack MacNeish, III, Santa Ana, CA (US); Charles Brandon Sweeney, Pflugerville, TX (US); Alex Stockton, Austin, TX (US)

(73) Assignee: Nexa3D Inc., Ventura, CA (US)

( * ) Notice: Subject to any disclaimer, the term of this patent is extended or adjusted under 35 U.S.C. 154(b) by 492 days.

(21) Appl. No.: 17/736,719

(22) Filed: May 4, 2022

(65) Prior Publication Data

US 2022/0288848 A1 Sep. 15, 2022

Related U.S. Application Data

(63) Continuation of application No. PCT/US2020/059151, filed on Nov. 5, 2020.
(Continued)

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/295* (2017.08);
(Continued)

(58) Field of Classification Search
CPC ... B29C 64/118; B29C 64/209; B29C 64/295; B29C 64/393; B33Y 10/00; B33Y 30/00; B33Y 50/02
See application file for complete search history.

(56) References Cited

U.S. PATENT DOCUMENTS 9,669,582 B2 6/2017 Larsen et al.
10,293,591 B2 5/2019 Nielsen-Cole et al.
(Continued)

FOREIGN PATENT DOCUMENTS

TW 201811540 A 4/2018

OTHER PUBLICATIONS

International Search Report and Written Opinion for PCT/US20/59151, International Search Authority, mailed Feb. 4, 2021.
(Continued)

*Primary Examiner* — Jamel M Nelson
(74) *Attorney, Agent, or Firm* — Ascenda Law Group, PC

(57) ABSTRACT

A nozzle assembly for a printer head of a 3D printer includes at least two conduit portions, with each conduit portion including an interfacing surface having a recessed channel that is non-linear. The recessed channels cooperate with one another to define a serpentine path, in response to the interfacing surfaces of the associated conduit portions being engaged to one another. The serpentine path extends from a feed opening to a discharge opening for moving a filament therethrough. The nozzle assembly further includes a heating element connected to the conduit portions for transferring heat to the filament disposed in the serpentine path to fully melt the filament without caramelizing or burning the filament.

11 Claims, 4 Drawing Sheets

Related U.S. Application Data

(60) Provisional application No. 62/930,659, filed on Nov. 5, 2019.

(51) Int. Cl.
| | | |
|---|---|---|
| *B29C 64/295* | (2017.01) | |
| *B29C 64/393* | (2017.01) | |
| *B33Y 30/00* | (2015.01) | |
| *B33Y 50/02* | (2015.01) | |

(52) U.S. Cl.
CPC ............ *B29C 64/393* (2017.08); *B33Y 30/00* (2014.12); *B33Y 50/02* (2014.12)

(56) References Cited

U.S. PATENT DOCUMENTS

| | | | | |
|---|---|---|---|---|
| 2014/0322383 A1* | 10/2014 | Rutter | ................... | B29C 64/209 |
| | | | | 425/500 |
| 2017/0021566 A1* | 1/2017 | Lund | ..................... | B29C 64/314 |
| 2018/0326660 A1* | 11/2018 | Gifford | ................. | B29C 64/241 |

OTHER PUBLICATIONS

Taiwanese Office Action in 109138726, Taiwan Intellectual Property Office (TIPO), mailed Jun. 9, 2021.

* cited by examiner

NOZZLE ASSEMBLY WITH A SERPENTINE PATH FOR PRINTER HEAD OF 3D PRINTER

CROSS-REFERENCE TO RELATED APPLICATIONS

This application is a continuation of international application number PCT/US2020/059151, filed on Nov. 5, 2020, which claims priority to U.S. provisional patent application No. 62/930,659 filed on Nov. 5, 2019. The contents of these applications are incorporated herein by reference in their entirety.

FIELD

The present disclosure relates generally to a nozzle assembly for a printer head of three-dimensional printer, and more particularly to a nozzle assembly with a serpentine path configured to fully melt filament in fused filament fabrication (FFF) without caramelizing or burning the filament.

DRAWINGS

The drawings described herein are for illustration purposes only and are not intended to limit the scope of the present disclosure in any way.

FIG. 1 a perspective view of an example of a printer head for a three-dimensional printer ("3D printer") and for use with a support table, illustrating the printer head having a nozzle assembly;

DETAILED DESCRIPTION

The following description is merely exemplary in nature and is not intended to limit the present disclosure, application, or uses.

Figure 1:
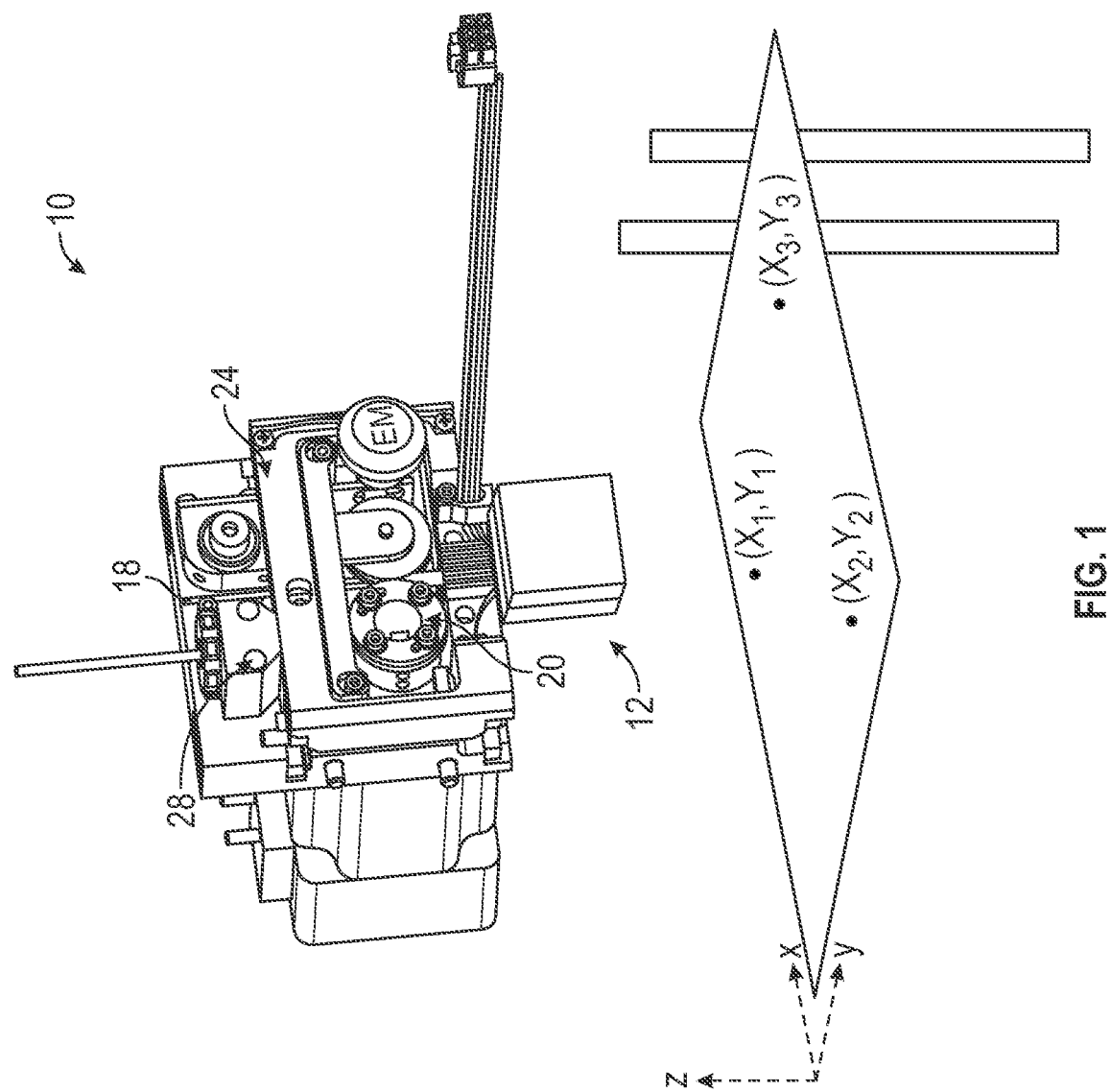

Referring to FIG. 1, a printer head 10 for a three-dimensional printer (3D printer) has a nozzle assembly 12, which includes a heating element 14 (FIG. 3) and a serpentine path 32 (FIG. 2) with a plurality of cross-sectional widths for increasing a melt path for a filament 18 and fully melting the filament 18 without caramelizing or burning the filament 18. The nozzle assembly 12 further includes one or more sensors 16 (FIG. 3) for detecting one or more associated parameters of the filament, such as volumetric flow rate and pressure.

The nozzle assembly 12 is configured to receive, heat, and dispense a 3D filament 18 to progressively build a 3D structure. The 3D filament 18 typically is an elongated tubular member made of various polymer or non-polymer materials. Non-limiting examples of filament materials include polyester, polyether ether ketone, polyethylene, and thermoplastic elastomers. In addition, the materials may include various modifiers that may alter the mechanical, chemical or visco-elastic properties of the material. The nozzle assembly 12 receives the 3D filament 18 from one or more spools (not shown), heats the 3D filament to a predetermined temperature, and dispenses the 3D filament onto a support table 26. The 3D structure is formed by dispensing successive layers of the 3D filament material from the nozzle. A variety of different 3D filament materials may be used to build different 3D structures having different structural properties and appearances. In this example, the printer head 10 further includes a feed system 20 for drawing filament 18 from a spool (not shown) and feeding the filament 18 into the nozzle assembly 12. However, in other examples, the printer head 10 may not include the feed system because the nozzle assembly 12 MAY include a separate drive mechanism (not shown) for feeding filament through the nozzle assembly.

The printer head 10 includes a z-axis plate assembly 24 for carrying the nozzle assembly 12 along the z-axis, in upward and downward directions relative to the support table 26, which supports the 3D printed article independently of the feed system 20. Furthermore, a sensor assembly 28 is provided, which detects the location of the nozzle assembly 12 relative to the support table 26. It is contemplated that the nozzle assembly can include sensors for detecting any suitable parameter or condition of the nozzle assembly or filament therein.

Figure 2:
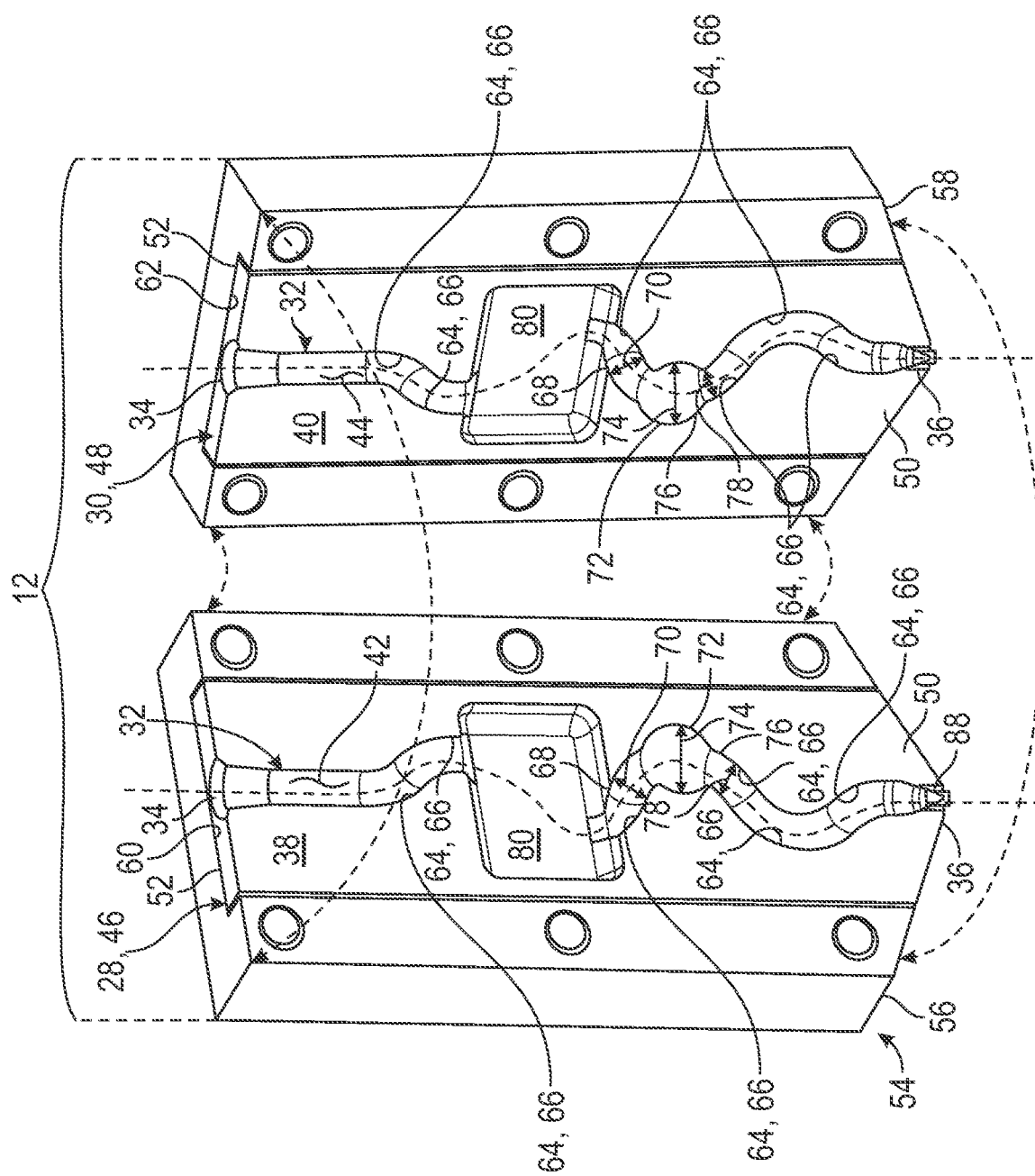
FIG. 2 is an enlarged exploded view of the nozzle assembly of FIG. 1, illustrating the nozzle assembly having two conduit portions defining a serpentine path, in accordance with an aspect of the present invention.
Figure 3:
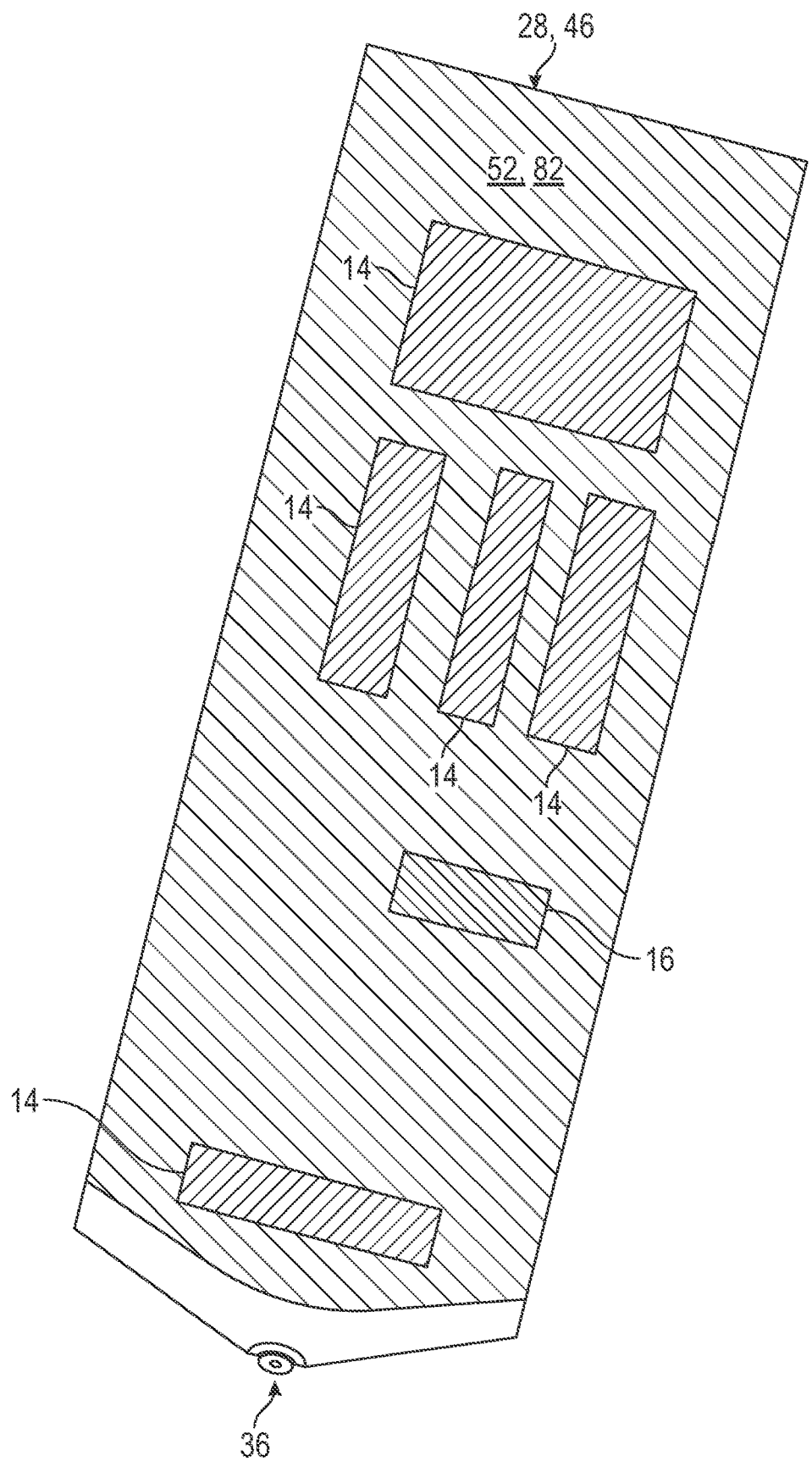
FIG. 3 is a perspective view of an outer side of one of the conduit portions of FIG. 2, illustrating the outer side of the conduit portion having a planar surface for mounting a sensor and multiple heating elements.

Referring now to FIG. 2, the nozzle assembly 12 includes two or more conduit portions 28, 30 cooperating with one another to define a serpentine path 32 that extends from a feed opening 34 to a discharge opening 36 for moving the filament 18 (FIG. 1) therethrough. As compared to a linear path of a conventional nozzle assembly (not shown), the serpentine path 32 provides a longer distance that the filament travels through the nozzle assembly and a longer time that the filament receives heat from the nozzle assembly 12, for a common flow rate and common nozzle temperature. The additional heat transferred to filament in the serpentine path can fully melt the filament without burning or caramelizing the same.

In this example, the conduit portions 28, 30 are separate components that are positioned side-by-side relative to one another such that each conduit portion cooperates with the other conduit portions to define the entire length of the serpentine path 32 from the feed opening 34 to the discharge opening 36. However, as detailed below in the description for FIG. 4, other embodiments of the nozzle assembly may include conduit portions that are separate components positioned in succession end-to-end such that a single conduit portion can define a length of the serpentine path without other conduit portions.

Two or more of the conduit portions 28, 30 includes an associated interfacing surface 38, 40, and each interfacing surface has a recessed channel 42, 44. The recessed channels 42, 44 are non-linear and cooperate with one another to define the serpentine path 32 in response to the interfacing surfaces 38, 40 of the associated conduit portions 28, 30 being engaged to one another. Continuing with the previous example, the conduit portions 28, 30 includes two separate plates 46, 48. Each of the plates has a first side 50 and a second side 52, with the first side 50 forming the planar interfacing surface 38. Furthermore, the nozzle assembly 12 also includes a securing mechanism 54 connected to the conduit portions for attaching the conduit portions to one another and defining the serpentine path. In this example, the securing mechanism 54 includes first and second brackets 56, 58 with associated first and second seats 60, 62 for holding a corresponding one of the conduit portions 28, 30. The first and second brackets 56, 58 are engaged to one another by one or more fasteners to position the channels 42, 44 relative to one another to define the serpentine path 32. The brackets may include a plurality of holes configured to receive associated bolt fasteners for holding the brackets to one another and clamping the conduit portions to one another. However, it is contemplated that the securing mechanism can include any bracket and other suitable fastening mechanisms.

The conduit portions 28, 30 can cooperate with one another to define the serpentine path 32 with a plurality of arcuate sections 64. Each arcuate section 64 includes an associated surface 66 configured to redirect the filament 18 (FIG. 1) so as to increase a localized pressure of the filament against the associated surface 66 and increase an associated heat transfer.

The conduit portions 28, 30 are configured to define the serpentine path with a plurality of cross-sectional widths to increase or decrease the length of time that the filament is disposed within sections of the conduit portions. In continuation of the previous example, the conduit portions 28, 30 are configured to define a first segment 68 of the serpentine path 32 having a first diameter 70 and a second segment 72 of the serpentine path 32 positioned downstream of the first segment 68. The second segment 72 may be positioned adjacent to a heating element 14 (as described below) and have a second diameter 74 that is larger than the first diameter, such that the flow rate in the second segment is lower than it is through the first segment. The comparably larger diameter of the second segment 72 can decrease the flow rate through the second segment 72 adjacent to the heating element 14 and the filament receives more heat from the heating element 14 than it would if the flow rate were higher. Furthermore, the conduit portions 28, 30 are configured to define a third segment 76 of the serpentine path 32 positioned downstream of the second segment 72, and the third segment 76 has a third diameter 78 that is smaller than the second diameter, such that the flow rate may be higher than it is through the second segment. As but one example, the higher flow rate through the third segment 76 may be useful for discharging molten filament from the nozzle assembly 12 at a predetermined rate.

In continuation of the previous example, the conduit portions 28, 30 can cooperate with one another to define the serpentine path 32 with a central reservoir 80 fluidly connected to the feed opening 34 and the discharge opening 36. The central reservoir 80 is cuboidal with a center that is spaced equidistant from the feed opening 34 and the discharge opening 36. The central reservoir 80 may be positioned adjacent to the heating element 14 or sensor as described below. However, it is contemplated that the reservoir 80 can have other suitable shapes and be positioned at any location between the feed opening 34 and the discharge opening 36.

One or more of the conduit portions includes a planar surface 82 with the heating element 14, the sensor 16, thick film elements, or any combination thereof connected to the planar surface. The heating element 14 connected to at least one of the conduit portions for transferring heat to the filament disposed in the serpentine path. In this example, the heating element 14 is a heating cartridge 84 attached to the planar surface 82 with a resistive wire 86 electrically coupling the heating cartridge to a power source. In response to the heating element 14 receiving an electric current from the power source, the heating element 14 may be resistively and thermally excited, thereby causing the heating cartridge 84 heat the conduit portion, the adjacent segment of the serpentine path 32, and filament 18 therein through convection, conduction, and/or radiative heat transfer. It is contemplated that the heating element can be other suitable heating elements.

The sensor 16 is connected to at least one of the conduit portions for detecting at least one characteristic of the filament disposed in the serpentine path. In this example, the sensor 16 is a thermocouple configured to detect a temperature of the filament disposed in the segment of the serpentine path adjacent to the sensor 16. It is contemplated that the nozzle assembly can include other suitable sensors.

The nozzle assembly 12 further includes an extrusion port component 88 attached to the discharge opening 36 of the conduit portions 28, 30 and fluidly communicating with the serpentine path 32. The conduit portions 28, 30 have a first hardness and the extrusion port component has a second hardness that is higher than the first hardness, such that the abrasive molten material does not erode the associate portions of the discharge opening.

The nozzle assembly further includes an entry port component 90 attached to the feed opening 34 of the conduit portions 28, 30 and fluidly communicating with the serpentine path 32. The conduit portions 28, 30 have a first hardness and the entry port component 90 has a second hardness that is higher than the first hardness, such that the filament material does not erode the associate portions of the feed opening.

Figure 4:
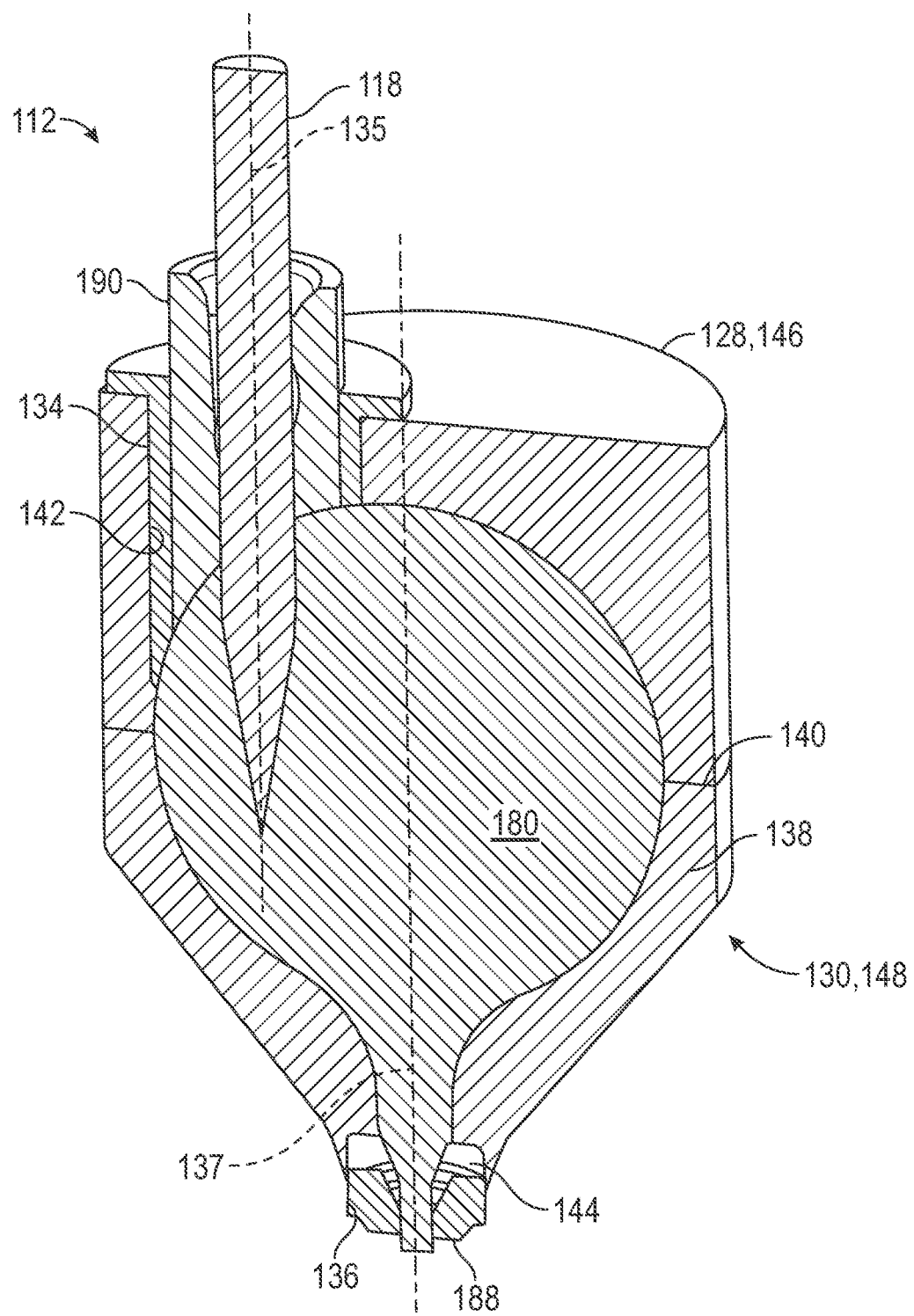
FIG. 4 is a cross-sectional view of another example of a nozzle assembly.

Referring now to FIG. 4, another embodiment of a nozzle assembly 112 is similar to the nozzle assembly 12 of FIG. 2. While the nozzle assembly 12 of FIG. 2 includes conduit portions 28, 30 that are positioned side-by-side, the nozzle assembly 112 of FIG. 4 includes conduit portions 128, 130 that are positioned in succession end-to-end such that each conduit portion is positioned either upstream or downstream of another conduit portion. The conduit portions 128, 130 define a serpentine path to the extent that feed opening 134 and the discharge opening 136 are disposed along associated axes 135, 137 that are spaced from one another. Also, in this embodiment, the nozzle assembly 112 further includes an insulation component 192 thermally spacing the entry port component 190 from the conduit portion 128.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A nozzle assembly for a printer head of a 3D printer, the nozzle assembly comprising:
   at least two conduit portions, with each of the at least two conduit portions including an interfacing surface having a recessed channel that is non-linear, the recessed channels cooperate with one another to define a serpentine path in response to the interfacing surfaces of the associated at least two conduit portions being engaged to one another, the serpentine path extending from a feed opening to a discharge opening for moving a filament therethrough;
   a heating element connected to at least one of the two conduit portions for transferring heat to the filament disposed in the serpentine path to fully melt the filament without caramelizing or burning the filament; and
   a securing mechanism connected to the conduit portions for attaching the conduit portions to one another and defining the serpentine path
   wherein:

the at least two conduit portions are positioned side-by-side relative to one another and cooperate with one another such that each of the at least two conduit portions defines the entire length of the serpentine path from the feed opening to the discharge opening, the at least two conduit portions includes two separate plates, and each of the two plates has a first side and a second side, with the first side forming an associated one of the interfacing surfaces, and each of the interfacing surfaces is planar, and the securing mechanism includes first and second brackets with associated first and second seats for holding a corresponding one of the conduit portions, the first and second brackets are engaged to one another by one or more fasteners to position the recessed channels relative to one another to define the serpentine path.

2. The nozzle assembly of claim 1 wherein the first and second brackets include a plurality of holes configured to receive an associated one of the fasteners for holding the brackets to one another and clamping the conduit portions to one another.

3. The nozzle assembly of claim 2 wherein the heating element comprises a heating cartridge and a resistive wire for electrically coupling the heating cartridge to a power source, the heating element is resistively and thermally excited, thereby causing the heating cartridge to heat the at least two conduit portions and the filament in the serpentine path through at least one of convection, conduction, and radiative heat transfer, in response to the heating element receiving an electric current from the power source.

4. A nozzle assembly for a printer head of a 3D printer, the nozzle assembly comprising:
at least two conduit portions, with each of the at least two conduit portions including an interfacing surface having a recessed channel that is non-linear, the recessed channels cooperate with one another to define a serpentine path in response to the interfacing surfaces of the associated at least two conduit portions being engaged to one another, the serpentine path extending from a feed opening to a discharge opening for moving a filament therethrough, and the at least two conduit portions being configured to define the serpentine path with a plurality of cross-sectional widths along the serpentine path; and
a heating element connected to at least one of the two conduit portions for transferring heat to the filament disposed in the serpentine path to fully melt the filament without caramelizing or burning the filament, wherein:
the at least two conduit portions are configured to define a first segment of the serpentine path having a first diameter and a second segment of the serpentine path positioned downstream of the first segment, with the second segment positioned adjacent to the heating element and having a second diameter that is larger than the first diameter, such that a flow rate through the second segment is lower than a flow rate through the first segment and the filament disposed in the second segment receives more heat from the heating element than the filament disposed in the first segment,
the at least two conduit portions are configured to define a third segment of the serpentine path positioned downstream of the second segment, and the third segment has a third diameter that is smaller than the second diameter, such that a flow rate through the third segment is higher than the flow rate through the second segment,
the at least two conduit portions cooperate with one another to define the serpentine path with a central reservoir fluidly connected to the feed opening and the discharge opening, and the central reservoir is positioned adjacent to the heating element, and
the conduit portions can cooperate with one another to define the serpentine path with a plurality of arcuate sections, each of the arcuate sections includes an associated surface configured to redirect the filament so as to increase a localized pressure of the filament against the associated surface and increase an associated heat transfer.

5. The nozzle assembly of claim 4 wherein the at least two conduit portions are positioned side-by-side relative to one another and cooperate with one another such that each of the at least two conduit portions defines the entire length of the serpentine path from the feed opening to the discharge opening.

6. The nozzle assembly of claim 5 wherein the at least two conduit portions includes two separate plates, and each of the two plates has a first side and a second side, with the first side forming an associated one of the interfacing surfaces, and each of the interfacing surfaces is planar.

7. The nozzle assembly of claim 6 further comprising an extrusion port component attached to the discharge opening of the at least two conduit portions and fluidly communicating with the serpentine path, wherein the at least two conduit portions have a first hardness and the extrusion port component has a second hardness that is higher than the first hardness, such that an abrasive molten material of the filament does not erode the at least two conduit portions at the discharge opening.

8. The nozzle assembly of claim 6 further comprising an entry port component attached to the feed opening of the at least two conduit portions and fluidly communicating with the serpentine path, wherein the at least two conduit portions have a first hardness and the entry port component has a second hardness that is higher than the first hardness, such that the filament material does not erode the associate portions of the feed opening.

9. The nozzle assembly of claim 6 wherein the heating element comprises a heating cartridge and a resistive wire for electrically coupling the heating cartridge to a power source, the heating element is resistively and thermally excited, thereby causing the heating cartridge to heat the at least two conduit portions and the filament in the serpentine path through at least one of convection, conduction, and radiative heat transfer, in response to the heating element receiving an electric current from the power source.

10. The nozzle assembly of claim 9 further comprising a thermocouple connected to at least one of the two conduit portions for a temperature of the filament disposed in the serpentine path adjacent to the thermocouple.

11. The nozzle assembly of claim 4 wherein the at least two conduit portions are positioned in succession end-to-end such that each of the at least two conduit portions is positioned one of upstream and downstream of the other of the at least two conduit portions.

* * * * *